United States Patent [19]

Bertalero

[11] Patent Number: 5,443,546
[45] Date of Patent: Aug. 22, 1995

[54] METHOD AND A DEVICE FOR WRAPPING A PRODUCT IN A WRAPPER OF SHEET MATERIAL

[75] Inventor: Roberto Bertalero, Acqui Terme, Italy

[73] Assignee: Soremartec S.A., Schoppach-Arlon, Belgium

[21] Appl. No.: 174,432

[22] Filed: Dec. 20, 1993

[51] Int. Cl.[6] .................. B65B 47/00; B65G 49/00
[52] U.S. Cl. ........................... 53/453; 53/461; 53/464; 53/221
[58] Field of Search .............. 53/453, 461, 559, 466, 53/221, 329.5, 464

[56] References Cited

U.S. PATENT DOCUMENTS

| | | | |
|---|---|---|---|
| 1,689,018 | 10/1928 | Froidevaux | 53/486 |
| 2,539,390 | 1/1951 | Almgren et al. | 53/486 |
| 2,775,080 | 12/1956 | Stirn et al. | 53/486 |
| 2,811,818 | 11/1957 | McCarty | 53/486 |
| 3,010,262 | 11/1961 | Rumsey, Jr. | 53/453 |
| 3,160,999 | 12/1964 | Lee | 53/486 |
| 3,184,895 | 5/1965 | O'Connor | |
| 3,753,837 | 8/1973 | Lense | 53/329.5 |
| 3,874,145 | 4/1975 | Schmidt | 53/329.5 |
| 4,322,465 | 3/1982 | Webster | 53/453 |
| 4,372,098 | 2/1983 | Mason | 53/453 |

FOREIGN PATENT DOCUMENTS

| | | |
|---|---|---|
| 0082952 | 7/1983 | European Pat. Off. |
| 1784647 | 3/1959 | Germany |
| 3243500 | 5/1984 | Germany |
| 1596524 | 8/1981 | United Kingdom |

Primary Examiner—John Sipos
Assistant Examiner—Rodney A. Butler
Attorney, Agent, or Firm—Rothwell, Figg, Ernst & Kurz

[57] ABSTRACT

A close-fitting wrapper for a product is produced from two sheets, the first of which is made dish-shaped so as to surround the greater part of the product. The other sheet is laid on the rest of the product so as to assume a shape complementary to that of the product itself. After the two sheets have been joined peripherally to give the wrapper sealing characteristics and the edges which project beyond the region of the join have been trimmed, the wrapper formed is subjected to a shaping step which causes the first sheet to cover practically the entire product, hiding the second sheet from view.

28 Claims, 2 Drawing Sheets

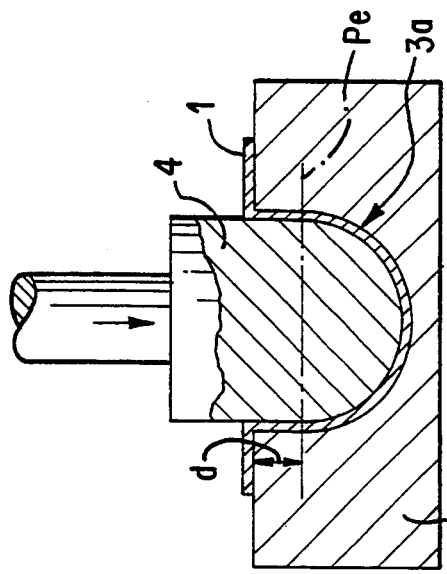
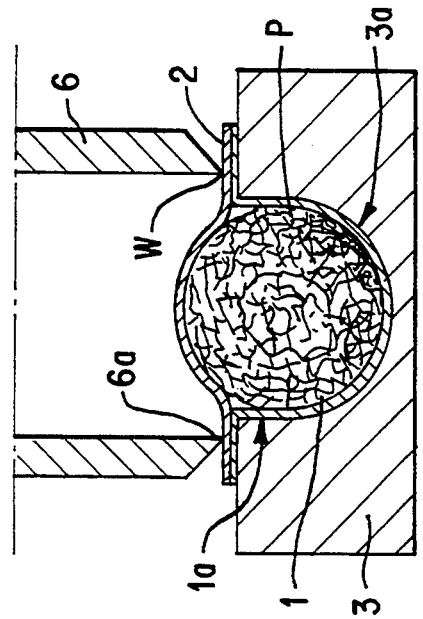
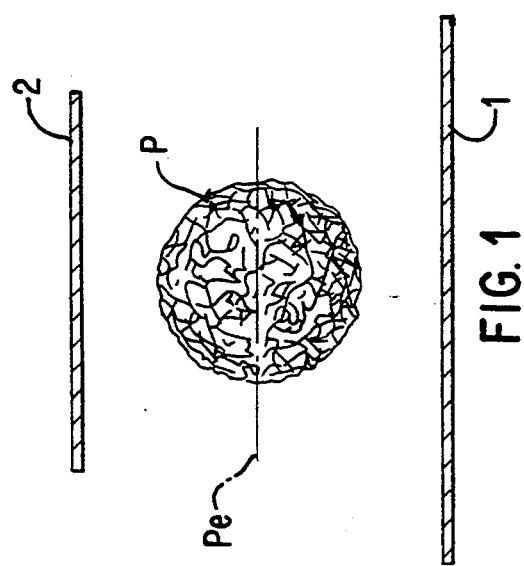
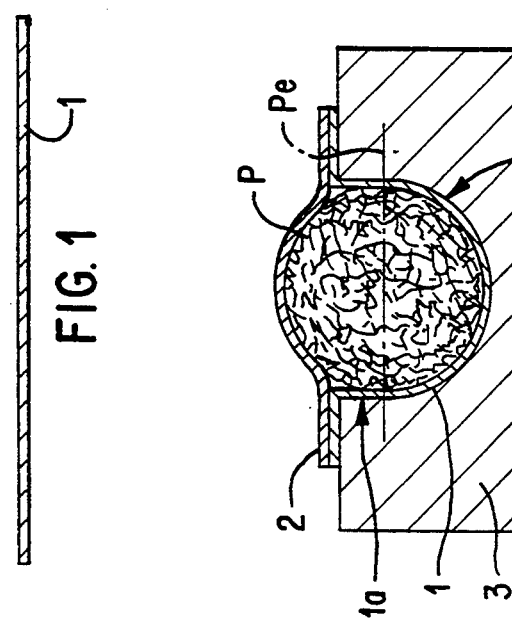

METHOD AND A DEVICE FOR WRAPPING A PRODUCT IN A WRAPPER OF SHEET MATERIAL

BACKGROUND OF THE INVENTION

The present invention relates to a method and a device for wrapping a product in a wrapper of sheet material. The invention has been developed with particular attention to its possible use for packaging products such as, for example, food products, particularly confectionery. In this field of application, the products (for example, spherical pralines, hollow or filled chocolate eggs, etc.) are quite often wrapped in sheets of material such as, for example, aluminium.

For example, European patent EP-B-0 082 952 describes a method which enables an approximately spherical praline to be wrapped in a sheet of aluminium. For this purpose, the product, placed on a sheet of aluminium, is passed through a structure with resilient blades so that after the sheet has assumed a generally cup-like configuration, as a result of being wrapped around the product, it is closed behind the product like a bunch or tail when the latter emerges from the resilient formations. The bunch or tail thus formed is then upset onto the product so that the product is completely wrapped in the sheet.

A solution which achieves the same final effect by a slightly different method is described in German patent DE-A-32 43 500.

The solutions described in the prior documents mentioned above produce excellent results, particularly as regards the appearance of the final product obtained. This is usually intended to be inserted in a paper cup with pleated walls with the portion of the wrapper which is upset onto the product facing downwardly, resting on the base of the cup. The upper part of the product is thus protected by a sheet wrapped neatly around the product.

The Applicant has found that these previously known solutions could be further improved, particularly as regards isolation from the outside atmosphere.

From this point of view, it is generally known (see, for example, German utility model DE 1784647U) to package food products (such as chocolate or sugar-based products) in close-fitting wrappers of sheet material, such as aluminium, which are produced by forming two complementary aluminium leaves, each of which closely copies the shape of a respective half of the product. The two leaves of sheet wrapper thus produced are then interconnected along an equatorial line of the product, for example, by heat sealing, making use of the presence of a coating of hot-melting material on the mutually coupled faces, with the removal of the remaining parts of aluminium sheet which project beyond the region of the seal.

This solution, however, is unsuitable for use in a field such as that described above, particularly when the wrapped product is to be inserted in a paper cup. In fact the seal along the equatorial line is visible, giving the product as a whole an appearance typical of an automatically-packaged industrial product. On the other hand, it is desirable, particularly in the confectionery field, for the industrial product to retain presentation characteristics typical of a hand-made or semi-hand-made product and hence not to display seal lines, which are signs of the intervention of a machine, in visible positions.

SUMMARY OF THE INVENTION

The object of the present invention is to provide a packaging solution which retains the advantages of the solutions described above in combination, but which eliminates the disadvantages just considered.

According to the present invention, this object is achieved by virtue of a method having the specific characteristics recited in claim 1.

The invention also relates to a device for carrying out said method.

BRIEF DESCRIPTION OF THE DRAWINGS

The invention will now be described, purely by way of non-limiting example, with reference to the appended drawings, in which:

FIGS. 1 to 6 show successive steps of the method according to the invention.

DESCRIPTION OF THE PREFERRED EMBODIMENTS

Figure 6:
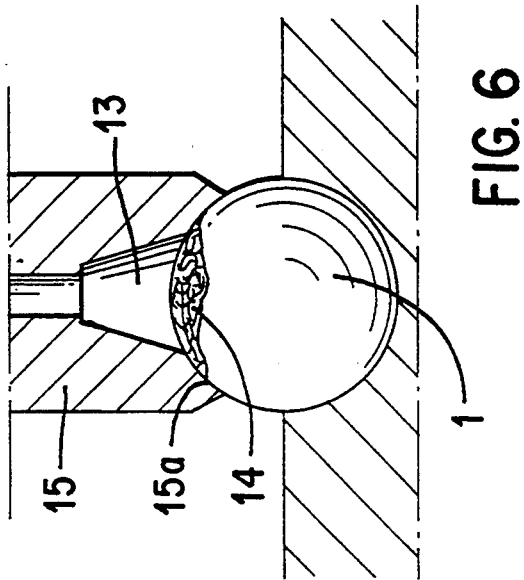

In the embodiment illustrated, the product to be packaged is constituted by a generally spherical praline P. For example, this may be a praline constituted by a spherical wafer shell with a pasty or creamy filling coated externally with chocolate, for example hazelnut chocolate, or a similar coating, possibly with the application of grated coconut, chopped hazelnuts, etc. which give the outer surface of the praline P a generally irregular appearance.

It should, however, be underlined that the invention may be applied to products of different kinds and completely different shapes. Still within the field of the confectionery industry, reference may be made to hollow or filled chocolate eggs, various chocolates, approximately spherical pralines with flat bottoms, small meringues, etc.

According to the invention, two small sheets, indicated 1 and 2, of aluminium or other laminar material are used to form a close-fitting, sealed wrapper around the product P.

The selection of an aluminium sheet is considered preferable because it can be fitted around the product easily and also because the product may have surface irregularities. In particular, the internal faces of the two sheets 1 and 2 which are intended to face towards the product P, are preferably coated with a lacquer or a layer of hot-melting material. This is for reasons which will become clearer from the following.

Moreover, the two wrapping sheets 1, 2 do not generally have the same dimensions. In fact, the first sheet, indicated 1, usually has dimensions much larger than the development in a plane of the facing half portion (a hemispherical cap-like portion in the present case) of the product P. By way of indication, the sheet 1, which is usually square or rectangular, may be considered to have dimensions approximately sufficient to cover the product P completely, at most leaving the polar portion opposite the sheet 1 itself uncovered. For the piece 2, on the other hand, it is possible to select dimensions such that its size corresponds approximately to, or is even slightly smaller than, the development in a plane of the facing half-portion of the product P; with reference to the example illustrated, this half-portion is also defined by a hemispherical cap-like portion.

The two half-portions mentioned above may be regarded as being separated by a theoretical equatorial plane Pe which identifies the maximum cross-section of the product P; this applies whether the product P is spherical, as in the embodiment illustrated (a spherical praline P) or whether it is of a different shape such as, for example, an egg-shape or a shape reproducing the features of a small figure. Whatever the shape of the product P, an equatorial plane Pe which defines its region of maximum cross-section will generally be identifiable; in this connection, it can also be noted that, regardless of their nature, confectionery products are often themselves constituted by two complementary portions (hollow or filled) connected along an equatorial plane Pe.

The first step in the packaging of the product P consists of a step in which the sheet 1 is shaped (possibly by drawing) to a generally dished or cup-like shape. This step is usually carried out by means of a tool comprising a die 3 defining a cavity 3a which a punch 4 can enter. For a general description of the possible criteria for the production of such a shaping tool, reference may usefully be made to application DE-A-32 43 500 already mentioned above. The cavity 3a and the active portion of the tool 4 have complementary surfaces for shaping the sheet 1 by gripping it between them. In particular, the lower portion (with reference to FIG. 2) of the cavity 3a in the die 3 has a shape exactly complementary to the shape of the half-portion of the product P which is to be wrapped by the sheet 1.

The cavity 3a, however, (and correspondingly, the drawing tool 4) is generally "deeper" than would be necessary simply to shape the sheet 1 in a manner exactly complementary to the respective half-portion of the product P. This is shown in FIG. 2, which shows the position of the imaginary equatorial plane Pe of the product P in relation to the cavity 3a. As can be seen, this equatorial plane Pe is not exactly aligned with the plane of the mouth of the cavity 3a; on the contrary, the plane Pe is disposed further within the die 3 by a distance generally indicated d in FIG. 2.

By way of indication, the magnitude of the distance d may be, for example, of the order of 8-10 mm, in the case of a spherical product P with a diameter of the order of about 25-30 mm.

The effect of the shape adopted for the cavity 3a and the punch 4 is to make the sheet of aluminium 1 generally pot- or cup-shaped so that it can house the product P as shown schematically in FIG. 3. In this figure, it is assumed that the product P is introduced into the cup-shaped sheet 1 when the latter is still in the drawing die 3. Naturally, this selection should not be considered essential in the sense that, after it has been made cup-shaped, the sheet 1 may be removed from the die 3 and transferred to another die or to another cavity formation for supporting the sheet 1 for the insertion of the product P.

Whatever selection is adopted, it will be noted that, once the product P has been introduced into the cup-shaped sheet 1, it is wrapped closely thereby, well above the diametral plane Pe.

In other words, once the sheet 1 has been shaped, in addition to a hemispherical base portion which is intended to house the hemispherical lower cap-like portion of the product P, it also comprises a neck portion, indicated 1a, which extends to cover—although not to fit closely—the opposite (upper) hemispherical cap-like portion of the product P. Naturally, it should be noted once more that the reference to hemispherical cap-like portions is dictated by the fact that the example of use described relates to a product P constituted by a substantially spherical praline. The same considerations apply in an identical manner, however, if egg-shaped, eliptical or mixtilinear cap-like portions are concerned rather than spherical cap-like portions.

By way of orientation, the sheet 1 may be said to cover between about $\frac{2}{3}$ and $\frac{3}{4}$ of the length of the product P, with reference to the "vertical" axis of the product P, this term meaning an axis perpendicular to the equatorial plane Pe.

In these conditions (that is, in the condition shown in FIG. 3) the other sheet 2 is then applied to the product P.

In general, the sheet 2 is simply placed on the upper portion of the product P which projects upwards slightly out of and above the mouth portion of the cavity 3a.

Since the portion of the product P which projects from the mouth 3a is small (being of limited "vertical" height), the sheet 2 can remain, at least approximately, in the desired position without having to be formed beforehand so as to assume a shape exactly complementary to that of the portion of the product P which projects from the cavity 3a.

Instead, the sheet 2 is shaped only during a subsequent step, that is, when the sheets 1 and 2 are brought to positions in which they fit closely together along the outline of the mouth portion of the cavity 3a, and are joined by the operation of a tool 6 (and possibly also trimmed).

In this connection, it should be noted that, although FIG. 4 shows a single tool 6, the two steps described above (joining and trimming) may also be carried out in two successive steps with the use of two different tools.

The joining of the two sheets 1 and 2 is intended to ensure that the sheet wrapper formed around the product P is sealed from the exterior, thus preventing the product from coming into contact with the air and possibly deteriorating. The join may be formed with the use of a purely mechanical connection (for example, by folding locally), by gluing with applied material, or even (according to a greatly preferred solution) by heat-sealing preferably by melting the hot-melting coatings on the internal faces of the sheets 1 and 2 (by the direct application of heat or by the application of ultrasound vibration fields).

This can be achieved, for example, by means of a heat-sealing tool of the type currently used, for example, for applying sheets of aluminium coated with hot-melting material to the mouth portions of cup-shaped containers containing liquid or pasty products (for example, yoghurts or similar products).

The edges which have been joined together can be trimmed with a hollow punching tool, the cutting edge of which, indicated 6a in FIG. 4, extends along a line (a circle in the embodiment illustrated, in which the product P is spherical) which surrounds the rim of the mouth portion of the cavity 3a externally.

The trimming tool 6 may advantageously be formed, for example, as a sonotrode for the application of an ultrasound front for carrying out the joining simultaneously with the trimming. Similarly, the joining may be carried out together with the trimming by also heating the cutting tool so as to bring about local fusion of the hot-melting material applied to the aluminium sheets.

In any case, it can be appreciated that the tool which first acts on the coupled edges of the sheets 1, 2 (typically the welding tool) finishes by simultaneously also shaping the upper sheet 2 around the cap-like upper portion of the product P which projects from the cavity 3a. A generally closed and close-fitting wrapper is thus formed around the product P by a single positive shaping operation (that is, that carried out on the sheet 1 during the step shown in FIG. 2); the shaping of the sheet 2, however, is not achieved as a result of a specific shaping operation, but simply during the joining of the sheet 2 to the sheet 1. Thus, the solution according to the invention saves one of the partial shaping operations of the wrapper conventionally carried out in solutions of the prior art.

Moreover, the fact that, as far as the wrapping of the product P by the sheet 1 is concerned, the first sheet 1 is shaped deeply, beyond the equatorial plane Pe, enables the dimensions of the second sheet 2 to be reduced considerably thus achieving an overall saving of wrapping material.

Furthermore, the solution described has also been found excellent as regards the need to prevent the wrapper, formed as a result of the joining of the sheets 1 and 2 around the product P, from retaining within it, between the outer wall of the product P and the inner wall of the closed wrapper, appreciable masses of air which may induce a certain deterioration of the product or possibly bulging of the final package produced.

Upon completion of the joining and the trimming of the sheets 1 and 2 (FIG. 4), the product P, wrapped in the sheets 1 and 2 which are connected along their perimetral edges, is introduced into a tool 10 substantially similar to that described in European patent EP-B-0 082 952. For this purpose, the product P is removed from the cavity in which it has been kept for the joining of the sheets 1 and 2 (in the present description, it is assumed that this cavity corresponds to the cavity 3a in which the initial shaping of the sheet 1 was effected, but this selection is certainly not essential) and introduced into the upper aperture 11 of the tool 10, the sheet 1 being kept facing downwards.

As described further in the European patent mentioned above, the tool 10 comprises, essentially, a support structure in which there is an aperture 11 (which, in the embodiment illustrated, is assumed to be circular, with a vertical axis), from which a plurality of resilient tongues 12, for example of metal, extend downwards, the tongues being resiliently loaded so that, in the absence of external forces, they converge towards the vertical axis of the cavity 11 to generally congruent positions, in an arrangement comparable to that of the outer leaves of an artichoke.

Figure 5:
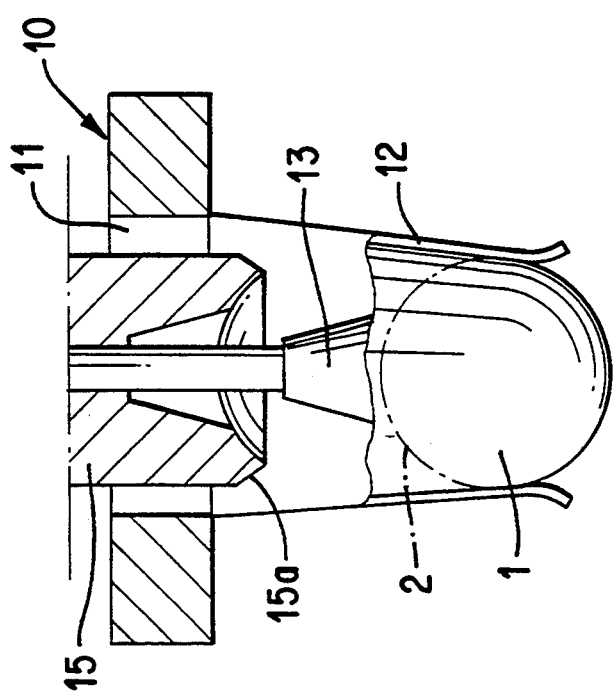

The product P, wrapped in the sheets 1 and 2, with the sheet 1 facing downwards, is passed vertically downwards through the aperture 11 from above under the action of a thrust element 13. The resilient tongues 12 spread out as a result of the passage of the product P and then close again behind the product so that the sheet 1 is made to fit closely on the half-portion (the upper half-portion in the position shown in FIG. 5) which was originally opposite the sheet 1. A kind of tail or bunch is thus formed by the sheet 1 behind the product P emerging from the tool 10, the sheet 1 enclosing the sheet 2 within it as shown schematically in chain line in FIG. 5.

In particular, as the tongues 12 close resiliently behind the descending product P (for a detailed description of the methods and criteria for carrying out this function, see the description of European patent EP-B-0 082 952) they close the sheet 1 and the sheet 2 within it behind the product P, thus forming a mass of sheet material which can be upset so as to fit closely onto the product P, as indicated at 14 in FIG. 6. The upsetting of the mass of sheet material (formed partly by the sheet 2 which fits closely on the product P, and partly by the sheet 1 which in turn is folded onto the sheet 2) is carried out by an upsetting tool 15 which is mounted around the thrust element 13 for sliding axially and the lower end of which has a cap-shaped cavity 15a which exactly matches the shape of the upper portion of the product. For a description of the criteria which regulate the movement of the thrust element 13 and of the upsetting tool 15, reference should again be made to the description of the European patent already mentioned several times above.

Figure 7:
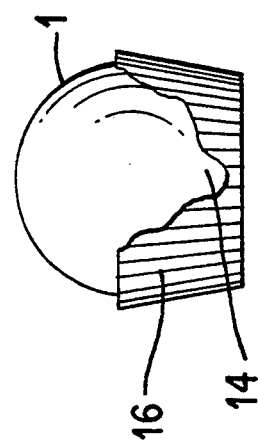
FIG. 7 shows the final result of the packaging operation comprising the steps shown in FIGS. 1 to 6.

Upon completion of the upsetting of the sheet wrapper, the product P may be placed in a paper cup 16 with pleated walls according to the criteria shown in FIG. 7. It will be appreciated that, in this position, only the sheet 1 is visible from outside the cup 16. This sheet does not cover only half of the product P but covers practically the whole of the product P, enclosing the sheet 2 within it. The sheet 2, however, is not visible externally, and neither is the upset region 14 which is disposed against the base wall of the cup 16.

Moreover, the seal line along which the sheets 1 and 2 are joined is not visible from the exterior.

The product thus retains the desired final appearance without seal lines visible from the exterior whilst being housed in a wrapper which can provide a durable seal against the outside atmosphere.

What is claimed is:

1. A method of wrapping a product in a wrapper of sheet material, including the steps of:
    providing first and second sheets of wrapping material,
    shaping the first sheet to a shape substantially complementary to that of the product in conditions such that, once the first sheet is shaped, it covers the greater part of the product,
    inserting the product in the first shaped sheet,
    applying the second sheet to the portion of the product which is left uncovered by the first sheet so that the second sheet assumes a shape complementary to the respective portion of the product,
    joining the first and second sheets together to form a substantially closed wrapper around the product, and
    further shaping the first sheet around the product and over the second sheet so that the first sheet hides substantially all of the second sheet from the exterior.

2. A method according to claim 1, wherein the first sheet has substantially larger dimensions than the second sheet.

3. A method according to claim 1, for wrapping products each having an equatorial plane theoretically dividing the product into two portions which can face the first and second sheets respectively, wherein the first sheet is shaped so as to extend from the respective portion of the product a certain distance beyond the equatorial plane.

4. A method according to claim 1, wherein the first sheet is shaped by being formed between a die and a punch.

5. A method according to claim 1, wherein the first sheet is shaped by a drawing operation.

6. A method according to claim 1, wherein the second sheet is applied to the product substantially without preliminary shaping operations.

7. A method according to claim 1, wherein the first and second sheets are joined together sealingly by a joining operation selected from the group constituted by:
mechanical shaping,
gluing by the application of material from the exterior,
heat sealing,
ultrasound sealing.

8. A method according to claim 1, wherein the first and second sheets are coated with a layer of hot-melting material on their faces which are to be joined together.

9. A method according to claim 1, comprising the step of removing the portions of the first and second sheets which extend beyond the region of the join.

10. A method according to claim 1, wherein removal step is carried out simultaneously with the joining together of the first and second sheets.

11. A method according to claim 1, wherein the first and second sheets are of metallic material, such as aluminum.

12. A method according to claim 1, wherein the further shaping step is carried out by passing the product, wrapped in the first and second sheets joined together, through an aperture defined by radially contractile formations so that a tail or bunch is formed behind the product.

13. A method according to claim 3, wherein once the first sheet has been shaped it covers the product housed within it for between two thirds and three quarters of the length of the product, with reference to an axis generally perpendicular to the equatorial plane.

14. A method according to claim 12, comprising the step of subjecting the tail or bunch to a step in which it is generally upset against the product.

15. A device for wrapping a product in a wrapper including first and second sheets of wrapping material, comprising:
shaping means for shaping the first sheet into a shape substantially complementary to that of the product in conditions such that, once the first sheet is shaped, it covers the greater part of the product,
joining means for joining the second sheet which is applied to the portion of the product left uncovered by the first shaped sheet which houses the product, so as to form a substantially closed wrapper around the product, and
further shaping means for shaping the first sheet around the product and over the second sheet so that the first sheet hides substantially all of the second sheet from the exterior.

16. A device according to claim 15, wherein the first sheet has substantially larger dimensions than the second sheet.

17. A device according to claim 15, for wrapping products each having an equatorial plane dividing the product theoretically into two portions which can generally face the first and second sheets, respectively, wherein the shaping means are formed in a manner such that the first sheet is shaped so as to extend from the respective portion of the product a certain distance beyond the equatorial plane.

18. A device according to claim 15, wherein the shaping means comprise a die and a punch.

19. A device according to claim 15, wherein the shaping means comprise a drawing tool.

20. A device according to claim 15, wherein the shaping means act exclusively on the first sheet.

21. A device according to claim 15, wherein the joining means are selected from the group constituted by:
mechanical shaping means,
means for gluing by the application of material from the exterior,
heat-scaling means,
ultrasound-sealing means.

22. A device according to claim 15, wherein the first and second sheets are coated with a layer of hot-melting material on their faces which are to be joined together.

23. A device according to claim 15, comprising means for removing the parts of the first and second sheets which extend beyond the region of the join, effected in two distinct steps.

24. A device according to claim 15, wherein the first and second sheets are of metallic material, preferably aluminum.

25. A device according to claim 15, wherein the further shaping means has an aperture which is defined by radially contractile formations and through which the product, wrapped in the first and second sheets joined together, can pass so that a tail or bunch is formed behind the product which has passed through the formations.

26. A device according to claim 17, wherein the shaping means are formed in a manner such that, once the first sheet is shaped, it covers the product housed within it for a distance of between two thirds and three quarters of the length of the product, with reference to an axis generally perpendicular to the equatorial plane.

27. A device according to claim 23, wherein the joining means are configured so as to comprise said means for removing the portions of the first and second sheets which extend beyond the region of the join.

28. A device according to claim 25, comprising upsetting means for upsetting the tail or bunch against the product.

* * * * *